(12) United States Patent
Lammens et al.

(10) Patent No.: US 10,766,984 B2
(45) Date of Patent: Sep. 8, 2020

(54) HIGH PRESSURE POLYETHYLENE PRODUCT COOLING

(71) Applicant: ExxonMobil Chemical Patents Inc., Baytown, TX (US)

(72) Inventors: Henri A. Lammens, Antwerp (BE); Paul J. Clymans, Kapelle-op-den-Bos (BE); Cindy Dewitte, Puurs (BE)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 0 days.

(21) Appl. No.: 15/752,509

(22) PCT Filed: Jul. 27, 2016

(86) PCT No.: PCT/US2016/044170
§ 371 (c)(1),
(2) Date: Feb. 13, 2018

(87) PCT Pub. No.: WO2017/044194
PCT Pub. Date: Mar. 16, 2017

(65) Prior Publication Data
US 2019/0010260 A1    Jan. 10, 2019

Related U.S. Application Data

(60) Provisional application No. 62/217,369, filed on Sep. 11, 2015.

(51) Int. Cl.
*C08F 218/08*    (2006.01)
*C08F 210/02*    (2006.01)
(Continued)

(52) U.S. Cl.
CPC .............. *C08F 210/02* (2013.01); *B01J 3/03* (2013.01); *B01J 3/04* (2013.01); *B01J 4/008* (2013.01);
(Continued)

(58) Field of Classification Search
CPC .. C08F 2/01; C08F 2/00; C08F 210/02; C08F 218/08
See application file for complete search history.

(56) References Cited

U.S. PATENT DOCUMENTS 3,036,057 A * 5/1962 Wallace .................... B01D 3/06
528/484
4,282,339 A    8/1981 Donaldson et al. ............ 526/64
(Continued)

FOREIGN PATENT DOCUMENTS

CN    106749814 A *  5/2017 ............ C08F 210/02
CN    106749815 A *  5/2017 ............ C08F 210/02
(Continued)

OTHER PUBLICATIONS

Asteasuain, M. et al. (2008) "Rigorous Dynamic Model of the High-Pressure Polymerization of Ethylene in Tubular Reactors Able to Predict the Full Molecular Weight Distribution," *Materials Science*, 9 pg.s.
(Continued)

*Primary Examiner* — Rip A Lee
(74) *Attorney, Agent, or Firm* — ExxonMobil Chemical Patents, Inc.—Law Department

(57) ABSTRACT

This disclosure relates to systems and processes for cooling polymer product mixtures manufactured at high pressure. The processes of the invention involve cooling and then subsequently reducing the pressure of the product mixture from the reactor. In the systems of the invention, a product cooler is located downstream of the high pressure reactor and upstream of a high pressure let down valve.

24 Claims, 2 Drawing Sheets

(51) Int. Cl.
*C08F 2/00* (2006.01)
*C08F 2/34* (2006.01)
*B01J 19/24* (2006.01)
*B01J 4/00* (2006.01)
*B01J 19/00* (2006.01)
*B01J 3/03* (2006.01)
*B01J 3/04* (2006.01)
*B01J 19/06* (2006.01)

(52) U.S. Cl.
CPC ......... *B01J 19/002* (2013.01); *B01J 19/0013* (2013.01); *B01J 19/06* (2013.01); *B01J 19/2415* (2013.01); *C08F 2/34* (2013.01); B01J 2204/005 (2013.01); B01J 2219/00006 (2013.01); B01J 2219/0015 (2013.01); B01J 2219/0027 (2013.01); B01J 2219/00094 (2013.01); B01J 2219/00159 (2013.01); B01J 2219/00162 (2013.01); B01J 2219/00259 (2013.01); Y02P 30/48 (2015.11)

(56) References Cited

U.S. PATENT DOCUMENTS

| | | | |
|---|---|---|---|
| 4,496,698 A | 1/1985 | Adriaans et al. | 526/64 |
| 6,596,241 B2 | 7/2003 | Donck | 422/132 |
| 6,899,852 B2 | 5/2005 | Donck | 422/132 |
| 7,582,709 B2* | 9/2009 | Goossens | B01J 19/2415 526/64 |
| 7,745,550 B2 | 6/2010 | Donck et al. | 526/64 |
| 8,273,835 B2* | 9/2012 | Littmann | C08F 10/02 526/64 |
| 8,445,606 B2 | 5/2013 | Lammens et al. | 526/64 |
| 8,906,312 B2* | 12/2014 | Clymans | B01J 4/008 422/112 |
| 9,068,032 B2 | 6/2015 | Karjala et al. | C08F 210/16 |
| 9,441,057 B1* | 9/2016 | Littmann | C08F 110/02 |
| 10,005,862 B2 | 6/2018 | Finette et al. | C08F 210/02 |
| 2007/0032614 A1* | 2/2007 | Goossens | B01J 19/2415 526/65 |
| 2010/0022736 A1* | 1/2010 | Van Nuland | C08F 10/02 526/352 |

FOREIGN PATENT DOCUMENTS

| | | | | |
|---|---|---|---|---|
| CN | 106749821 A | * | 5/2017 | ............. C08F 210/16 |
| WO | 2012/117039 A | | 9/2012 | |
| WO | 2015/166297 A | | 11/2015 | |

OTHER PUBLICATIONS

Whitely, K. S. et al. (2005) "Polyolefins," *Ullman's Encyclopedia*, Wiley-VCH Verlag GmbH & Co., pp. 1-13.

* cited by examiner

HIGH PRESSURE POLYETHYLENE PRODUCT COOLING

CROSS-REFERENCE OF RELATED APPLICATIONS

This application is a National Phase Application of International Application Serial No. PCT/US2016/044170, filed Jul. 27, 2016, and claims the benefit of U.S. Ser. No. 62/217,369, filed Sep. 11, 2015 and EP Application No. 15195757.8, filed Nov. 23, 2015, the disclosures of which are hereby incorporated by reference in their entireties.

FIELD OF THE INVENTION

This invention relates to systems and processes for cooling polymer products manufactured at a high pressure.

BACKGROUND OF THE INVENTION

High pressure polymerization reactors are widely used for the manufacture of ethylene-based polymers, and include autoclave reactors which typically operate at between about 1220 to 2000 bar (122 to 200 MPa) and tubular reactors which typically operate at between about 2500 and 3100 bar (250 to 310 MPa). For both types of reactors, fresh monomer from a monomer supply is compressed to reactor pressure by the combination of a primary compressor which pressurizes the monomer to an intermediate pressure, and a second compressor which pressurizes the monomer together with monomer from the intermediate pressure up to a final reactor pressure. Both types of reactors create a product mixture comprising principally polymer and unreacted monomer. The mixture typically leaves the reactor through a high pressure let down valve, and then enters a separation system in which unreacted monomer is separated from the polymer and recycled back to the process.

A variety of ethylene-based polymers can be manufactured in high pressure processes. Ethylene-vinyl acetate copolymers ("EVA") may be produced in high pressure reactors and are commonly used in films and other applications where clarity and gloss are important. The weight percent of units derived from vinyl acetate comonomer in EVA typically varies from as low as 1 wt % to as high as 40 wt %, with the remainder of the polymer being ethylene-derived units.

Polymerization of ethylene-based polymers is a highly exothermic process. The reaction initiation temperature, or the temperature at which polymerization is started may be from about 120° C. to about 240° C. The exothermic nature of the process can lead to maximum temperatures within the reactor of from about 160° C. to about 360° C. Consequently, there is a need to cool the product mixture after it has left the reactor to limit polymer decomposition and the formation of high molecular weight polymer, as well as to enhance monomer recovery and obtain a good pellet cut in downstream processing.

In the prior art, this cooling has been accomplished by injecting cold ethylene into the flow of product mixture from the reactor. This cools the product mixture as it enters the separation system, promoting phase separation of the product into a polymer-rich liquid phase and a monomer-rich gas. Before the cold ethylene can be injected, however, it must be compressed to a relatively high pressure that will enable such injection. To accomplish this, the required flow of cold, compressed ethylene has been diverted out of the flow of make-up ethylene that the primary compressor supplies to the second compressor. Typically, the discharge pressure of the primary compressor is set to a level that is at least equal to the suction pressure of the secondary compressor. This alone places a considerable demand on the primary compressor. When ethylene from the primary compressor is diverted to quench the product mixture, however, the discharge pressure of the primary compressor must be set to a level considerably higher than the suction pressure of the secondary compressor. Such a design substantially increases the energy and capacity requirements of the primary compressor, and thus adds significantly to the cost and complexity to the process.

This cooling has also been accomplished by a product cooler downstream of the high pressure let down valve and upstream of the product separation system. In the production of EVA in conventional high pressure processes, however, where a product cooler is located downstream of the high pressure let down valve, increased gel levels in the polymer and an increased tendency of the reactor system to foul have been observed. This is particularly so when the EVA product comprises moderate or higher levels of units derived from vinyl acetate comonomer, such as levels at or above about 6 wt %. Background references include US 2007/032614, WO 2012/117039, and WO 2015/166297.

Thus, there is a need for improved systems and processes for cooling ethylene-based polymer product mixtures in high pressure processes. Particularly, there is a need for improved systems and processes for cooling EVA product mixtures manufactured at high pressure, especially processes capable of minimizing gels in the product and mitigating fouling within the reactor system.

SUMMARY OF THE INVENTION

The invention is related to processes for producing an ethylene-based polymer, the processes comprising compressing ethylene monomer to a pressure of at least 122 MPa, forming, in a reactor, a product mixture comprising an ethylene-based polymer from the compressed ethylene monomer, and cooling the product mixture and subsequently reducing the pressure of the product mixture.

The invention is also related to systems for producing an ethylene-based polymer, the systems comprising a compressor system adapted to compress ethylene monomer to a pressure of at least 122 MPa, a reactor, a high pressure let down valve downstream of the reactor, and a product cooler downstream of the reactor and upstream of the high pressure let down valve.

The processes and systems disclosed herein may be used in the production of ethylene-based polymers in high pressure polyethylene processes. They may be particularly useful in the production of EVA, especially when the EVA product comprises levels of units derived from vinyl acetate comonomer at or above about 6 wt %. The processes and systems disclosed herein minimize gels in the EVA product and mitigate fouling within the reactor system.

DETAILED DESCRIPTION OF THE INVENTION

Figure 1:
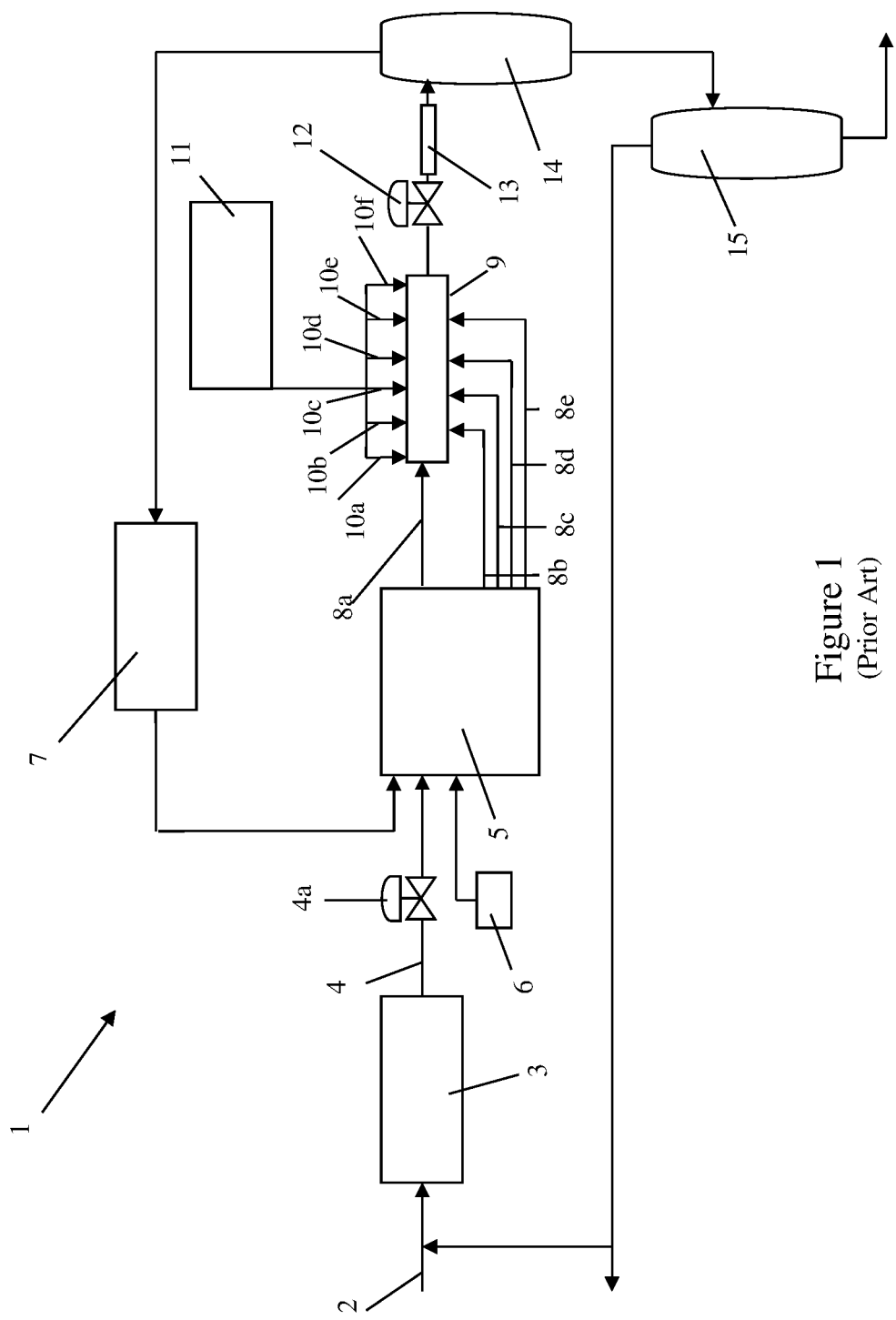
FIG. 1 shows schematically an ethylene polymerization plant or apparatus according to the prior art.

In many high pressure polymerization processes, the polymer product mixture is cooled downstream of the reactor. Typically, the polymer product mixture exits the reactor at a relatively high temperature, e.g., about 160° C. to 360° C. If the product mixture is left at this high temperature, the polymer may suffer from heat degradation and the formation of undesired byproducts, e.g., carbon, methane, acetylene, and ethane. Additionally, the heat may adversely impact polymer properties and the polymer may not process well downstream, for example, it may be difficult to get a good pellet cut in extruder operations.

High pressure ethylene-based polymer reactor systems typically include a high pressure let down valve downstream of the reactor. The product mixture exits the reactor through the high pressure let down valve, and the valve is used to control pressure within the reactor. In conventional high pressure ethylene-based polymer processes, a product cooler is located downstream of the high pressure let down valve. The pressure downstream of the high pressure let down valve is lower than inside the reactor. This depressurization causes phase separation of the product mixture into a polymer-rich liquid phase and a monomer-rich gas. Thus, in conventional processes, the product mixture typically enters the product cooler downstream of the high pressure let down valve in two phase conditions. The dimensions of the product cooler must provide a velocity that keeps the polymer dispersed in the flow so polymer does not adhere to the walls of the cooler.

When manufacturing certain ethylene-based polymers in conventional processes, including the conventional processes discussed herein, increased gel levels in the polymer and an increased tendency of the reactor system to foul have been observed. This is especially so when EVA is manufactured in these processes, and in many cases the problems are exacerbated when the EVA product comprises moderate or higher levels of units derived from vinyl acetate comonomer, such as levels at or above about 6 wt %. The present invention addresses these problems.

Processes according to the invention involve cooling and then subsequently reducing the pressure of the product mixture coming from the high pressure reactor. This is in contrast to prior processes, where the pressure of the product mixture is first reduced and then the product mixture is cooled. In the processes of the invention, the cooling reduces the temperature of the product mixture by at least about 10° C., 20° C., 30° C., 40° C., 60° C., 80° C., or 100° C. The cooling may reduce the temperature of the product mixture to a value of from about 140° C. to about 280° C., for example, the cooling may reduce the temperature of the product mixture to less than 280° C., 240° C., 200° C., 180° C., 160° C., or 140° C. Subsequently, the pressure of the product mixture may be reduced by the desired amount, such as by at least about 50 MPa, at least about 100 MPa, or at least about 150 MPa.

In systems according to the invention, a product cooler is located downstream of the high pressure reactor and upstream of a high pressure let down valve. This is in contrast to prior processes, where the product cooler is located downstream of a high pressure let down valve. Upstream of the high pressure let down valve, the product mixture has not phase separated yet. In other words, the product mixture in the present invention typically enters the product cooler in one phase conditions rather than two phase conditions. A pressure drop exists along the length of the product cooler, which forces the product mixture along the product cooler at a desired flow velocity. The pressure drop for a given throughput can be reduced by increasing the internal diameter of the product cooler, or likewise, increased by decreasing the internal diameter of the product cooler.

The product cooler of the present invention may operate with a flow velocity for the product mixture that is different from that of conventional product coolers used in high pressure ethylene-based polymer manufacturing processes. Typical product coolers in high pressure ethylene-based polymer manufacturing processes have flow velocities for the product mixture of less than about 20 m/s or greater than 45 m/s. The product cooler of the present invention may have a flow velocity for the product mixture of at least about 20 m/s, 22 m/s, 24 m/s, 26 m/s, 28 m/s or 30 m/s. For example, the product cooler may have a flow velocity for the product mixture of from a low of about 20 m/s, 23 m/s, 25 m/s, 27 m/s, or 30 m/s to a high of about 30 m/s, 33 m/s, 35 m/s, 40 m/s, or 45 m/s, including any combination of any low and high flow velocity disclosed herein.

The product cooler of the present invention transfers heat from the product mixture to a cooling medium, and enables control of the temperature of the product mixture exiting the product cooler. The product cooler may be of various designs. For example, the product cooler may comprise a conduit having a cooling jacket. The product cooler may also comprise a double pipe with counter current layout, with a pressurized closed water system or steam production providing the cooling medium. In the case of steam production, water may be flashed to produce the steam, and the temperature of the product mixture exiting the product cooler can be controlled by the steam pressure. An air fin cooler or other suitable design may also be used.

The product cooler typically has a length in the range of from 200 m to 500 m or 300 m to 450 m. For example, the product cooler may have a length of at least 200 m and an internal diameter of at least 60 mm. The product cooler may be designed to minimize fouling. This is done in part by selecting an internal diameter that is sufficiently small to create a desired pressure drop over the length of the cooler. As a result, a velocity within the range of about 20 m/s to about 45 m/s is achieved, which provides for a high heat transfer rate and low to no fouling. The fouling resistance of the product cooler of the present invention may be quantified by the increase of the resistance to the flow of heat of the product cooler due to fouling.

The product cooler may reduce the temperature of the product mixture to a value of from about 140° C. to about 280° C. Since the product cooler of the present invention is upstream of the high pressure let down valve, the temperature of the product mixture at the entry to the high pressure let down valve may be substantially less than the temperature of the product mixture at the entry of the product cooler. For example, the temperature of the product mixture at the entry to the high pressure let down valve may be at least 10° C., 20° C., 30° C., 40° C., 60° C., 80° C., or 100° C. less than the temperature of the product mixture at the entry of the product cooler. Additionally or alternatively, the temperature of the product mixture at the entry to the high pressure let down valve may be less than 280° C., 240° C., 200° C., 180° C., 160° C., or 140° C.

The product cooler of the present invention may use a pressurized closed utility water loop. The utility water may be heated as high as 200° C. in start-up or shutdown mode, and cooled as low as 30° C. during normal operation. The product cooler may also use cooling water or heat recuperation through steam generation. In the case of cooling water, the water may start as cold as 15° C. In the case of steam generation, hot utility water may be applied on the product cooler, with steam generated in a flash drum. The product cooler may be heated during start up and/or shutdown conditions to avoid product cooler cleanings during polymer production.

The pipe transferring the product mixture from the exit of the reactor to the entry of the product cooler may be insulated, for example with a jacket. Typically, the jacket includes steam tracing, and thus comprises a tube or small pipe carrying steam, which is parallel and attached to the surface of the pipe to be insulated. With such a jacket, steam at a certain temperature and pressure is applied without controlling the pressure of the steam. Unlike the product cooler of the present invention, such a jacket does not enable control of the temperature of the product mixture exiting the product cooler because the pressure of the steam is not controlled. Thus, a jacket insulated pipe with steam tracing is not a product cooler according to the invention. Additionally, in embodiments of the invention, the product cooler of the invention may not comprise steam tracing.

It is within the scope of the invention to provide product cooling downstream of the reactor using a combination of a product cooler upstream of the high pressure let down valve and a quench with cold ethylene gas. The quench may involve injecting cold, compressed ethylene into the product mixture prior to the entry of the product mixture into the separation system. The cold, compressed ethylene used for the quench may be diverted out of the flow of make-up ethylene that the first compressor supplies to the second compressor and injected into the product mixture just upstream of the separation system or at another suitable location downstream of the reactor. The quench system may also include a pump downstream of the reactor, the pump having a suction inlet that receives at least a portion of the ethylene monomer from the discharge of the primary compressor, as is described in U.S. Pat. No. 8,906,312, which is fully incorporated herein by reference.

The systems and processes of the present invention may also operate without a cold ethylene gas quench. For example, the product cooling may be accomplished solely via a product cooler upstream of the high pressure let down valve. In such a design, the entire output of the primary compressor may be fed to the secondary compressor. In other words, no ethylene is diverted from the discharge of the primary compressor and injected back into the process downstream of the reactor. Operating without a cold ethylene gas quench may be advantageous, as it may reduce the demands on the primary compressor and/or reduce both the amount of equipment necessary and overall operating costs.

In systems according to the present invention, a high pressure let down valve is located downstream of the product cooler. The pressure of the product mixture entering the high pressure let down valve may be at or near the pressure of the product mixture exiting the reactor. The high pressure let down valve substantially reduces the pressure of the product mixture. For example, the high pressure let down valve may reduce the pressure of the product mixture by at least about 50 MPa, at least about 100 MPa, or at least about 150 MPa.

It has been observed that systems and processes according to the present invention reduce gel levels in the ethylene-based polymer product versus conventional processes. They also reduce or eliminate the tendency of the reactor system to foul. These systems and processes may be particularly useful in the production of EVA, especially when the EVA product comprises levels of units derived from vinyl acetate comonomer at or above about 6 wt %.

Polymerization Process

The term "monomer" as used herein refers to ethylene and to any mixture of ethylene with one or more comonomers. Comonomers suitable for copolymerization with ethylene under high pressure include vinyl ethers, such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerizable vinyl compounds.

The systems and processes of the invention may be used for the manufacture of ethylene homopolymers and copolymers, such as EVA. Typically, comonomer will be pressurized and injected into the secondary compressor at one or more points. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Modifiers

The term "modifier" as used herein refers to a compound added to the process to control the molecular weight and/or melt index of a produced polymer. The term "chain transfer agent" is interchangeable with the term "modifier" as used herein. The process of the invention may involve the use of a modifier to control the molecular weight of the product polymer by promoting chain transfer.

Examples of chain transfer agents include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, and phosphine.

The modifier may be present in the invention in the amount of up to 5 kg per tonne of polyethylene, or from 0.5 to 5 kg per tonne of polyethylene, or from 1 to 5 kg per tonne of polyethylene, or from 2 to 5 kg per tonne of polyethylene, or from 3 to 5 kg per tonne of polyethylene, or from 4 to 5 kg per tonne of polyethylene.

For further details on modifiers, see Advances in Polymer Science, Vol. 7, pp. 386-448, (1970). Table 7 therein ranks several transfer agents in order of the chain transfer constant determined under set conditions. The tendency to copolymerize is indicated by the reactivity, also determined under set conditions.

The modifier can be added into the reaction mixture in any suitable way. For example, the modifier may be injected along with the initiator into the reactor. The modifier may also be injected into the suction or discharge of the secondary compressor. For example, the modifier may be injected into the inlet pipes feeding one or more of the secondary compressor first stage cylinders. The modifier is generally not fully consumed during one pass through the reactor and is generally also present in the recycle ethylene returning to the secondary compressor.

Initiators

Initiators are used to initiate the free radical ethylene polymerization process. Many suitable initiators are known, including but not limited to organic peroxide initiators. Peroxides are, for example, pure peroxide. Other suitable initiators include peresters such as bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides including di-tert-butyl peroxide, and mixtures thereof. A blend of several initiators having different half-life temperatures may be used in order to achieve the desired reaction kinetics.

The pure peroxides are mixed, typically in a hydrocarbon solvent, and are then injected into the reactor at the injection locations as described herein. Any suitable pump may be used, for example, a hydraulically driven piston pump.

The process may use, for example, from 0.3 kg to 1.5 kg of initiator per tonne of polyethylene polymer produced or from 0.3 kg to less than 0.7 kg of initiator per tonne of polyethylene.

Scavengers

Radical scavengers can be added to the process through the raw materials and lubrication oils. For example, in processes for making EVA, the vinyl acetate comonomer may contain a hydroquinone radical scavenger. The vinyl acetate comonomer may contain between 3 and 30 ppm, between 3 and 24 ppm, between 3 and 20 ppm, between 14 and 30 ppm, or between 14 and 24 ppm of hydroquinone. Higher or lower amounts may be selected depending on, among other factors, the activity of the comonomers present in the process stream.

Fresh vinyl acetate comonomer may also be injected into the common cylinders and interstage piping of the secondary compressor. The fresh vinyl acetate typically contains a radical scavenger, whereas recycled vinyl acetate coming in through the process recycle does not. Thus, injection of fresh vinyl acetate into the common cylinders enables the scavenger to be more evenly dispersed throughout the cylinders and interstage piping.

FIG. 1 is a schematic of a polymerization plant 1 according to the prior art. The polymerization plant 1 includes an ethylene feed line 2 which supplies fresh ethylene to a primary compressor 3. The function of the primary compressor is to pressurize fresh ethylene to the pressure of the ethylene recycle system, for feed to the secondary compressor. The primary compressor may be a single compressor that alone pressurizes the ethylene to the pressure of the recycle stream, or it may be two or more compressors in series or in parallel that, in combination, pressurize the fresh ethylene to the pressure of the ethylene recycle system.

The ethylene discharged from the primary compressor 3 flows via conduit 4 having a valve 4a to the secondary compressor 5. Also entering the secondary compressor 5 is a stream of fresh modifier(s) and/or optional comonomer(s) and a stream of recycled ethylene. The fresh modifier stream is supplied by a separate modifier pump 6. Any configuration of compressors is intended to be within the scope of this disclosure as long as the configuration is adapted to compress the monomer to the pressure necessary for supply to the reactor. The secondary compressor may be a two-stage reciprocating compressor having, for example, six or eight or more cylinders arranged in a compressor frame and having a common crankshaft driven by an electric motor standing at one end of the compressor frame. It is usually necessary to mount the compressor on foundations specially adapted to minimize vibration.

The secondary compressor 5 of FIG. 1 compresses the ethylene to the pressure necessary for supply to the reactor, and discharges the compressed ethylene in five streams 8a, 8b, 8c, 8d, and 8e. The number and location of compressed ethylene streams could vary depending on design and operating criteria. Stream 8a is heated by a steam jacket (not shown) which heats the ethylene, prior to entry into the front end of the tubular reactor 9. The four remaining ethylene side streams 8b, 8c, 8d, and 8e each enter the reactor 9 as sidestreams. Sidestreams 8b, 8c, 8d, and 8e are cooled.

The tubular reactor 9 is also shown with six initiator inlets 10a to 10f which are spaced at intervals along reactor 9 and are fed from an initiator mixing and pumping station 11. The number of initiator inlets may also vary. The first initiator injection point 10a is just downstream of the front end of the reactor 9 and defines the start of the first reaction zone. Initiator entering through that first initiator inlet 10a combines with the hot ethylene from stream 8a and polymerization begins, raising the temperature of the ethylene as it travels down tubular reactor 9. The temperature rises, peaks, and then falls as initiator is consumed and the rate of polymerization begins to decline. A heating/cooling jacket (not shown) fitted on reactor 9 cools the reaction mixture. Entry of the first sidestream 8b cools the reaction mixture further. The second initiator injection inlet 10b is just downstream of the entry point of sidestream 8b and defines the start of the second reaction zone. Once again, the temperature of the reaction mixture rises, peaks and falls as it flows along the tubular reactor 9 with the entry of the second sidestream 8c providing a further rapid cooling prior to entry of initiator at the third initiator inlet 10c, which defines the start of the third reaction zone. The remaining reaction zones are similar, although further ethylene sidestreams are optional.

The tubular reactor terminates at a high pressure let down valve 12. The high pressure let down valve 12 controls the pressure in the tubular reactor 9. Opening the valve decreases the pressure in the reactor, while closing the valve increases the pressure. A pressure drop exists along the length of the reactor which forces the product mixture along the reactor at a desired velocity. In prior art processes like FIG. 1, immediately downstream of the high pressure let down valve 12 is product cooler 13. Upon entry to the product cooler 13, the product mixture is in a phase separated state. It exits into high pressure separator 14. The overhead gas from the high pressure separator 14 flows into the high pressure recycle system 7 where the unreacted ethylene is cooled and returned to the secondary compressor 5.

A polymer product-rich stream flows from the bottom of the high pressure separator 14 into the low pressure separator 15, separating almost all of the remaining ethylene from the polymer. That remaining ethylene is transferred either to a flare (not shown) or a purification unit (not shown) or is recycled via the primary compressor 3. Molten polymer flows from the bottom of the low pressure separator 15 to downstream processing, such as to an extruder (not shown) for extrusion, cooling, and pelletizing.

Figure 2:
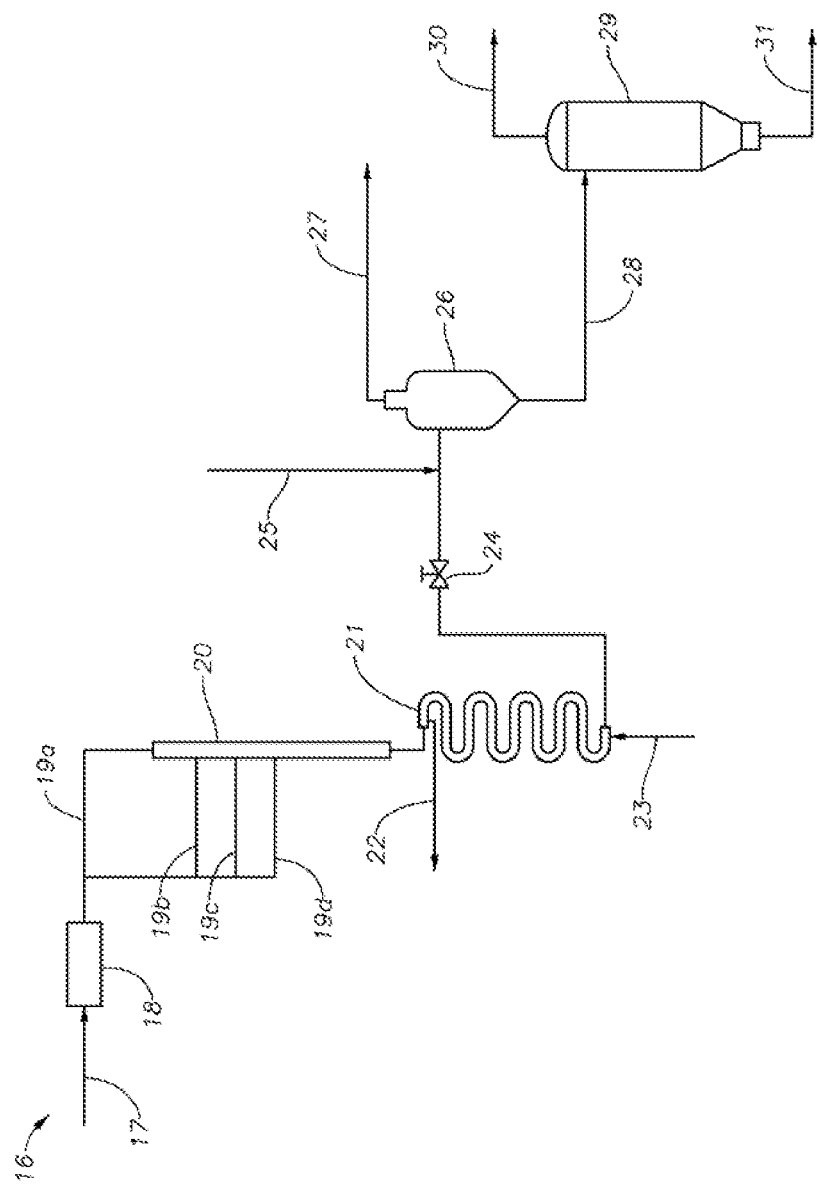
FIG. 2 shows schematically an ethylene polymerization plant or apparatus according to embodiments of the invention.

FIG. 2 is a schematic of a polymerization plant 16 according to embodiments of the invention. The polymerization plant 16 includes an ethylene feed line 17 coming from the primary compressor (not shown) and entering the secondary compressor 18. The secondary compressor 18 compresses the ethylene to the pressure necessary for supply to the reactor, and discharges the compressed ethylene in four streams 19a, 19b, 19c, and 19d. Stream 19a is heated by a steam jacket (not shown) prior to entry into the front end of the tubular reactor 20. The three remaining ethylene side streams 19b, 19c, and 19c each enter the tubular reactor 20 as sidestreams and are cooled prior to entry.

Initiator is added to tubular reactor 20 at any number of injection points (not shown). One or more modifiers may also be used and injected into the process at any suitable location(s) (not shown). The product mixture exits the tubular reactor 20 and enters a product cooler 21 immediately downstream of the tubular reactor 20 and upstream of a high pressure let down valve 24. The product cooler may be a single product cooler, as shown in FIG. 2, or two or more product coolers. The product cooler 21 has an entry point 23 for fresh cooling water and an exit point 22 for spent cooling water.

The cooled product mixture exits the product cooler 21 and flows through the high pressure let down valve 24. Upon exit of the high pressure let down valve 24, the product mixture enters a high pressure separator 26. Optionally, as shown in FIG. 2, a cold ethylene gas quench (e.g., cold, compressed ethylene) may be introduced to the product mixture via conduit 25 prior to entry of the product mixture into the high pressure separator 26. The overhead gas from the high pressure separator 26 flows via conduit 27 into the high pressure recycle system (not shown), where the unreacted ethylene in the gas is cooled and returned to the secondary compressor 18. A polymer product-rich stream flows from the bottom of the high pressure separator 26 via conduit 28 into the low pressure separator 29, separating almost all of the remaining ethylene from the polymer. The remaining ethylene is transferred via conduit 30 either to a flare (not shown) or a purification unit (not shown) or is recycled to the primary compressor (not shown). Molten polymer flows from the bottom of the low pressure separator 29 via conduit 31 to downstream processing, such as to an extruder (not shown) for extrusion, cooling, and pelletizing.

EXAMPLES

The following observations were noted on commercial scale high pressure polymerization reactor systems.

The first commercial scale polymerization reactor system was similar to the prior art system described in FIG. 1, and thus had a product cooler downstream of the high pressure let down valve. Poor gel performance was observed in various polymer grades, including four grades of EVA having levels of polymer units derived from vinyl acetate comonomer ranging from about 9 to about 20 wt % of the total polymer. The poor gel performance was observed to be irrespective of the product cooler operating mode, e.g., irrespective of whether the product cooler used cooling water, steam, etc.

The second commercial scale polymerization reactor system was similar to the system described in FIG. 2, and thus had a product cooler upstream of the high pressure let down valve according to embodiments of the invention. This reactor system was used to produce an EVA grade having 19 wt % of polymer units derived from vinyl acetate comonomer. The gas/EVA product mixture exited the reactor at about 217° C., and entered the product cooler immediately downstream of the reactor at a temperature of about 192° C. The pipe between the reactor exit and the entry of the product cooler was insulated with a jacket supplied with low pressure steam at about 140° C. and 3 bar. The product mixture was cooled in the product cooler to about 178° C. using utility water at a starting temperature of 145° C. A substantially greater degree of cooling could be achieved within the scope of this invention, if desired, by using a closed utility water loop designed to reach low temperatures, for example, as low as 30° C. The cooled product mixture entered the high pressure let down valve at a pressure of about 1860 barg, and exited the high pressure let down valve at a pressure of about 315 barg. The polymer produced was observed to have low gel levels, well within acceptable ranges for various commercial applications.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the methods and systems described herein and their advantages have been described in detail, it should be understood that various changes, substitutions, and alterations could be made without departing from the spirit and scope of the inventions described herein as defined by the following claims.

What is claimed is:

1. A process for producing an ethylene-based polymer, the process comprising:
   a. compressing ethylene monomer to a pressure of at least 122 MPa;
   b. in a high pressure reactor, forming a product mixture comprising an ethylene-based polymer from the compressed ethylene monomer; and
   c. cooling the product mixture in a product cooler located downstream of the high pressure reactor and subsequently reducing a pressure of the product mixture in a high-pressure let down valve downstream of the product cooler.

2. The process of claim 1, further comprising contacting the ethylene monomer and a catalyst with a vinyl acetate comonomer.

3. The process of claim 1, wherein the compressing is accomplished using a primary compressor and a secondary compressor, and further comprising feeding an entire output of the primary compressor to the secondary compressor.

4. The process of claim 1, comprising cooling the product mixture by at least about 30° C.

5. The process of claim 1, comprising cooling the product mixture to less than 200° C.

6. The process of claim 1, comprising reducing a pressure of the product mixture by at least about 50 MPa.

7. The process of any one of claims 1 to 6, further comprising insulating a pipe transferring the product mixture from an exit of the reactor.

8. The process of claim 1, further comprising controlling a temperature to which the product mixture is cooled in the product cooler.

9. The process of claim 1, wherein the velocity of a product mixture in the product cooler is at least about 20 m/s.

10. The process of claim 9, wherein the velocity of the product mixture in the product cooler is from about 20 m/s to about 40 m/s.

11. The process of claim 1, wherein forming the product mixture from the ethylene monomer comprises contacting the ethylene monomer with an initiator.

12. The process of claim 1, wherein forming the product mixture from the ethylene monomer comprises contacting the ethylene monomer with a modifier.

13. The process of claim 1, further comprising recovering the ethylene-based polymer from the product mixture.

14. The process of claim 13, wherein the recovered ethylene-based polymer comprises at least about 6 wt % of units derived from vinyl acetate comonomer.

15. A system for producing an ethylene-based polymer, the system comprising:
   a. a compressor system adapted to compress ethylene monomer to a pressure of at least 122 MPa;
   b. a reactor in which a product mixture comprising the ethylene-based polymer is formed;
   c. a high pressure let down valve downstream of the reactor; and
   d. a product cooler downstream of the reactor and upstream of the high pressure let down valve, and through which the product mixture is passed.

16. The system of claim 15, further comprising a pipe for transferring the product mixture from an exit of the reactor to an entry of the product cooler, wherein the pipe is insulated with a jacket.

17. The system of claim 16, wherein the jacket is adapted for steam tracing.

18. The system of claim 15, wherein the product cooler is not adapted for steam tracing.

19. The system of claim 15, wherein the product cooler is adapted to control a temperature of the product mixture exiting the product cooler.

20. The system of claim 15, wherein the product cooler is adapted to reduce a temperature of the product mixture to less than 200° C.

21. The system of claim 15, wherein the product cooler is adapted to reduce a temperature of the product mixture by at least about 30° C.

22. The system of claim 15, wherein the reactor is a tubular reactor or an autoclave reactor.

23. The system of claim 15, wherein the system further comprises a separation system downstream of the high pressure let down valve.

24. The system of claim 23, wherein the compressor system comprises a primary compressor and a secondary compressor and wherein the separation system comprises a quench system that cools the product mixture entering the separation system, the quench system including a pump, the pump having a suction inlet that receives at least a portion of the ethylene monomer from a discharge of the primary compressor.

* * * * *